March 20, 1928.  
G. J. DUNBAUGH, JR  
1,663,041  
LIQUID LEVEL INDICATOR  
Filed Oct. 10, 1923
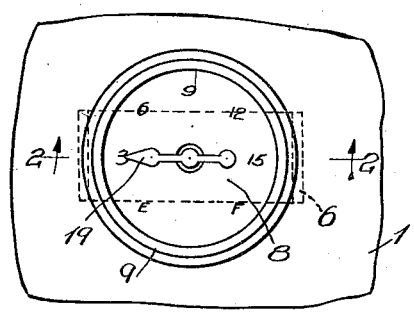
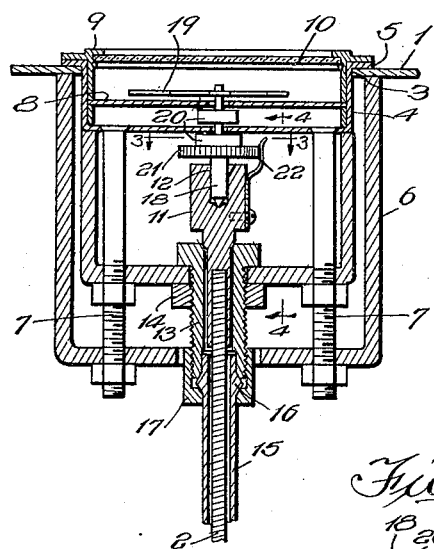
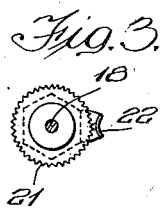
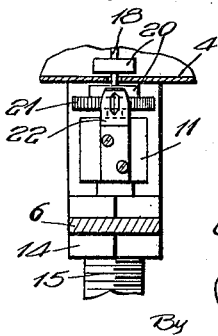
Witnesses:
W. J. Kilroy
Harry R. White
Inventor:
George J. Dunbaugh Jr.
By
Attys.

Patented Mar. 20, 1928.

1,663,041

UNITED STATES PATENT OFFICE.

GEORGE J. DUNBAUGH, JR., OF CHICAGO, ILLINOIS, ASSIGNOR TO CHAMPION MANUFACTURING COMPANY, OF CHICAGO, ILLINOIS, A CORPORATION OF ILLINOIS.

LIQUID-LEVEL INDICATOR.

Application filed October 10, 1923. Serial No. 667,672.

My invention relates to improvements in indicators or gauges for indicating the level of liquid in containers and especially for indicating at the dash-board of a motor vehicle the level of the gasoline in the tank at the rear of the car.

The invention has among its objects the production of a device of the kind described, which is simple, convenient, compact, durable, reliable, efficient and satisfactory for use wherever found applicable.

It is usually very difficult and inconvenient to adjust the needle or pointer of the indicating gauge in case its reading or indication is not exactly correct. In order to facilitate such adjustment I have provided a connection between the needle and the drive shaft for the same, whereby an adjustment or calibration of the needle may be effected without removing the needle from its spindle and without removing the needle from its case.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a front elevation showing my improved device in position upon the dash-board;

Fig. 2 is a section taken substantially on the line 2—2 of Fig. 1;

Fig. 3 is a section taken substantially on the line 3—3 of Fig. 2; and

Fig. 4 is a section taken substantially on the line 4—4 of Fig. 2.

In the drawings, wherein I have illustrated the preferred embodiment of my invention, 1 indicates the dash-board, panel or instrument board of a motor vehicle and through which the indicating portion or part of a suitable liquid level indicating means is positioned so that the operator of the vehicle may determine at a glance the condition of the gasoline supply.

A float or other means (not shown) may be arranged in the gasoline tank and connected with suitable mechanism to drive a flexible shaft 2 leading to the instrument board and to cause a rotation or oscillation of the shaft with incremental changes of the gasoline level.

An opening 3 is cut or formed through the instrument board 1, and a cup member 4 is inserted therethrough, said cup having a peripheral flange 5 bearing against one side of the instrument board. A bracket 6 is arranged at the opposite side of the instrument board and is removably connected to the cup member 4 by screws or bolts 7 so that when the nuts on these screws are tightened the bracket and cup member will be clamped against the opposite sides of the board.

A dial 8 may be arranged within the cup member and a removable bezel or frame 9 may be inserted within the cup, said bezel being adapted to hold or carry a transparent member 10 in place therein and through which the dial may be viewed.

The flexible shaft 2 has its end connected to a part 11 having a socket or seat 12 in the free end thereof, said member 11 adapted to rotatably seat in a threaded sleeve 13 having a head bearing against one side of the bracket 6. A nut 14 engages the threaded member 13 and clamps against the opposite side of the bracket to firmly hold the member 13 in place thereon. A conduit or sheathing 15 is preferably arranged to enclose the flexible shaft 2 and has an enlarged end 16 adapted to be received within and seat against the outer end of the sleeve member 13, as shown more particularly in Fig. 2. A nut 17 cooperates with the outer end of the member 13 to clamp the conduit in place therein.

Thus it is seen that a rotational movement given the shaft 2 will be transmitted directly to the member 11. This movement, however, must be transmitted further before it will be visible across the dial 8. For this purpose a stub shaft or spindle 18 is rotatably journalled within the socket 12 of the member 11 the opposite end of the shaft 18 extending through the dial and adapted to receive a needle or pointer 19 thereon. Collars 20 are adapted to be arranged on the shaft 18 on opposite sides of the bottom of the cup member 4 to position the members in their correct relation.

Heretofore it has been necessary to remove the pointer or needle 19 from the shaft or spindle and reset it whenever it was desired to adjust or calibrate the same. This has been found extremely inconvenient in most instances. In order to more easily accomplish the adjustment or calibration of the needle, I have arranged a toothed wheel 21 fixed on the stub shaft 18, said wheel being adapted to engage with a resilient toothed member or arm 22 carried by the part 11. The toothed member 22 may be ratcheted relative to the member 21. Thus by merely rotating the stub shaft 18 a desired angular distance the needle may be calibrated to read correctly across the dial. The member 22 resiliently presses against the member 21 and engages in the notches therein, and holds the parts in their desired adjusted relation, so that the drive of the shaft 2 is transmitted without slip to the stub shaft 18 through the frictionally interengaging members 21 and 22.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. An indicator comprising a dial member, a bracket, a shaft carried by said bracket and having a socket at one end, a pointer movable across said dial, a pointer shaft rotatably journalled in said socket, and means for transmitting drive between said shaft and pointer shaft and comprising a toothed wheel on one of said members and a resilient means fixed on the other of said members and adjustably engageable with the periphery of said toothed wheel.

2. An indicator comprising a dial cup, a dial arranged thereacross, a bracket for holding said dial cup in position, a drive shaft carried by said bracket and having a socket at one end, a spindle rotatably journalled in said socket and extending through said cup, a pointer carried by said spindle and movable across said dial, enlargements on said spindle on opposite sides of said cup so as to prevent axial displacement of said spindle, and means for transmitting rotation between said spindle and shaft and comprising a notched wheel carried by one of said members, a resilient arm carried by the other of said members and having a tooth engageable in said notches, whereby said members may be adjusted angularly of of one another.

3. An indicator comprising a dial member, a driven shaft having a socket at one end, a pointer movable over the dial, a pointer shaft rotatably journaled in said socket, a toothed wheel on the pointer shaft, and a resilient toothed member on the driven shaft for adjustable engagement with the toothed wheel.

In testimony whereof, I have hereunto signed my name.

GEORGE J. DUNBAUGH, Jr.